(12) United States Patent
Minasian et al.

(10) Patent No.: US 7,213,482 B2
(45) Date of Patent: May 8, 2007

(54) ACTUATOR WITH INTERNAL DRIVE TRAIN DISCONNECT

(75) Inventors: Henry Minasian, Weymouth, MA (US); William H. Fort, Stratham, NH (US)

(73) Assignee: Stoneridge Control Devices, Inc., Canton, MA (US)

( * ) Notice: Subject to any disclaimer, the term of this patent is extended or adjusted under 35 U.S.C. 154(b) by 0 days.

(21) Appl. No.: 10/384,181

(22) Filed: Mar. 7, 2003

(65) Prior Publication Data

US 2004/0074326 A1    Apr. 22, 2004

Related U.S. Application Data

(63) Continuation-in-part of application No. 09/836,033, filed on Apr. 17, 2001, now Pat. No. 6,557,688.

(60) Provisional application No. 60/362,854, filed on Mar. 7, 2002.

(51) Int. Cl.
*F16H 35/00*    (2006.01)
(52) U.S. Cl. .................. 74/421 A; 74/405; 74/425; 192/20
(58) Field of Classification Search ............. 74/421 A, 74/425, 416, 405; 310/75 R, 78, 83; 192/20, 192/31, 54.1, 54.5, 54.51, 54.52, 56.4
See application file for complete search history.

(56) References Cited

U.S. PATENT DOCUMENTS

| | | | | |
|---|---|---|---|---|
| 2,317,697 A | * | 4/1943 | Simpson | 49/136 |
| 2,753,030 A | * | 7/1956 | Wight | 192/103 R |
| 4,125,790 A | * | 11/1978 | Stratienko | 310/75 D |
| 4,520,914 A | * | 6/1985 | Kagiyama et al. | 192/71 |
| 4,819,493 A | * | 4/1989 | Dornan | 74/89.17 |
| 4,885,954 A | * | 12/1989 | Wanlass | 356/73.1 |
| 4,966,266 A | * | 10/1990 | Yamada et al. | 192/39 |
| 4,980,591 A | * | 12/1990 | Takanashi et al. | 310/83 |
| 5,233,879 A | * | 8/1993 | Watanuki et al. | 74/425 |
| 5,261,711 A | * | 11/1993 | Mizuki et al. | 292/201 |
| 5,295,730 A | * | 3/1994 | Rees | 297/361.1 |
| 5,855,130 A | * | 1/1999 | Rorabacher et al. | 70/277 |

FOREIGN PATENT DOCUMENTS

| | | | |
|---|---|---|---|
| FR | 2 407 161 | * | 5/1979 |
| JP | 6-281048 | * | 10/1994 |

* cited by examiner

*Primary Examiner*—William C. Joyce
(74) *Attorney, Agent, or Firm*—Grossman, Tucker, Perreault & Pfleger, PLLC

(57) ABSTRACT

An electro-mechanical actuator is provided that minimizes back drive effort by de-coupling the internal drive train of the actuator from the actuator output using a clutch. The clutch facilitates transfer of power to an output gear stage when the actuator motor is energized, but disengages the output gear stage when the actuator motor is de-energized. When the actuator output is manually operated, the clutch disengages the output gear stage, thereby reducing the number of gears that must be back driven by the manual actuation.

5 Claims, 1 Drawing Sheet

ACTUATOR WITH INTERNAL DRIVE TRAIN DISCONNECT

CROSS REFERENCE TO RELATED APPLICATIONS

This application claims the benefit of U.S. provisional patent application Ser. No. 60/362,854, filed on Mar. 7, 2002, the entire teachings of which are incorporated by reference. This application is a continuation-in-part of U.S. patent application Ser. No. 09/836,033, filed on Apr. 17, 2001, now U.S. Pat. No. 6,557,688.

FIELD OF THE INVENTION

The present invention relates generally to electro-mechanical actuators, and, in one embodiment, to an actuator including an internal drive train disconnect.

BACKGROUND OF THE INVENTION

Electro-mechanical actuators, in many applications, must allow for facile back drive of the actuator gear train. In automotive door latch applications, for example, the actuator may be configured to provide automated locking and unlocking of a vehicle door. However, when manual operation of the door latch assembly is required or desired, an operator must be able to back drive the actuator with an appropriate level of effort. In addition, it is often desirable to minimize audible noise associated with operation of the actuator gear train and to provide a reliable actuator at relatively low cost, especially in automotive applications.

SUMMARY

According to one aspect of the present invention, there is provided an actuator having reduced back drive resistance, the actuator including an internal drive train including a motor and at least one driven gear, a clutch coupled to the driven gear, and an output stage having at least one output gear coupled between the clutch and an actuator output. The clutch is disposed between the internal drive train and the output gear, and is engaged when the motor is energized, and disengaged when the motor is not energized. Locating the clutch near the actuator output in the mechanism reduces the number of gears that must be back driven when the mechanism is manually operated.

According to another aspect of the invention, there is provided an actuator having reduced back drive resistance. The actuator includes an internal drive train having a motor driving a pinion. The pinion drives a face gear coupled to a spur gear, and the spur gear drives a clutch drive gear. An output stage includes, a driven pinion gear coupled to a worm gear. The worm gear drives a sector gear coupled to an actuator output. A clutch is coupled between the clutch drive gear of the internal drive train and the driven pinion gear of the output stage. The clutch is engaged when the motor is energized and disengaged when the motor is not energized.

BRIEF DESCRIPTION OF THE DRAWING

For a better understanding of the present invention, together with other objects, features and advantages, reference should be made to the following detailed description which should be read in conjunction with the following figures wherein like numerals represent like parts.

DETAILED DESCRIPTION

Figure 1:
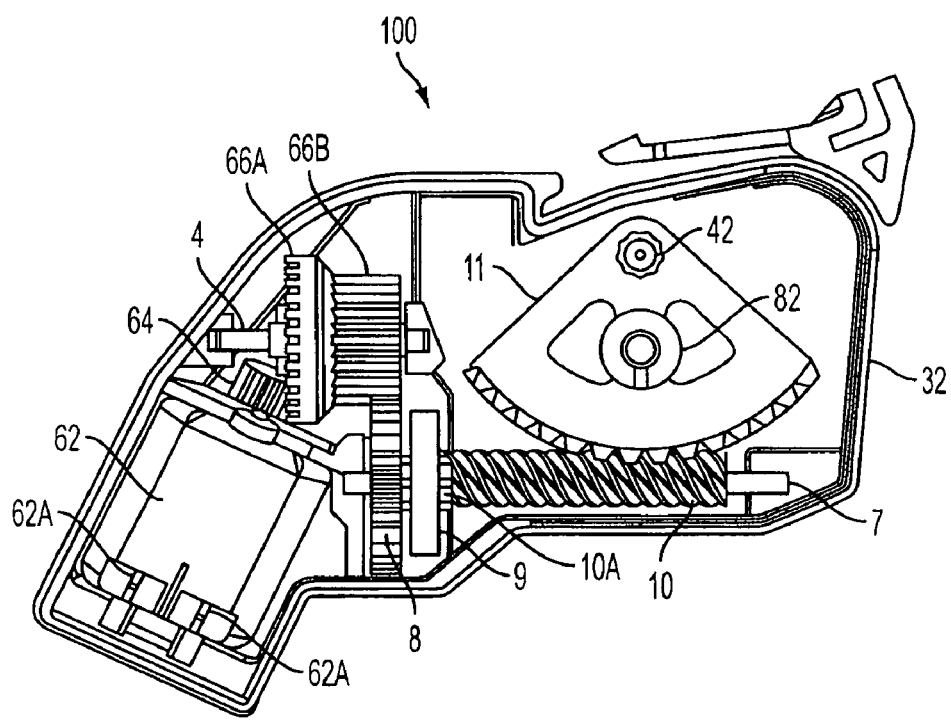
FIG. 1 is a top view of an exemplary actuator consistent with the invention with a top cover removed.

An exemplary actuator consistent with the invention will now be described in connection with an exemplary embodiment. It is to be understood that the illustrated embodiment is provided by way of explanation, not of limitation. In general, back drive effort is minimized in an actuator consistent with the invention by de-coupling the actuator internal drive train from the actuator output through use of a clutching mechanism. The coupling mechanism facilitates transfer of power to an output gear stage when the actuator motor is energized, but disengages the output gear stage when the actuator motor is de-energized. Accordingly, when the actuator output is manually operated the coupling mechanism disengages the output gear stage, thereby reducing the number of gears that must be back driven by the manual actuation.

Turning now to the exemplary embodiment illustrated in FIG. 1, the actuator 100 includes an electric motor 62 including a pinion gear 64 on its output shaft. The pinion gear meshingly engages a face portion 66A of a compound gear, which includes a spur gear portion 66B for driving a drive gear 8. Dive gear 8 connects and disconnects with a pinion gear 10A through a clutch 9. The pinion gear 10A is coupled to a high efficiency worm gear 10 through a shaft 7. The high efficiency worm gear 10 drives an output sector gear 11. Consistent with the exemplary embodiment, the sector gear 11 along with the worm 10 make up an output gear stage. Drive gear 8, spur gear 66B, face 66A, pinion 64, and motor 62 together make up the actuator internal drive train.

Advantageously, when the motor 62 is energized the clutch 9 connects the drive gear to the pinion gear 10A for driving the worm 10 and the output sector gear 11. A variety of configurations for clutch 9 will be known to those skilled in the art. For example, the clutch 9 may be configured including an inertially operated clutch plate eccentrically mounted on a clutch drive gear and having a pair of arcuately spaced driving teeth alternately engageable with the driven clutch gear when the motor is driven in either a forward or reverse direction, as described in U.S. Pat. No. 4,819,493, the teachings of which are incorporated herein by reference. Torsional effort is thus applied at output shaft 42.

In an automotive door latch embodiment, an actuator consistent with the invention may be advantageously used as described in U.S. Pat. No. 5,855,130 (the '130 patent), the teachings of which are incorporated herein by reference. In such application, the actuator may be operatively coupled to a latch as shown and described in connection with FIGS. 1 and 7 of the '130 patent. However, numerous other suitable modes of coupling an actuator consistent with the present invention will be understood by those having skill in the art.

Advantageously, an actuator consistent with the invention may also include top and bottom housing portions, the outline of one half of which is indicated by 32 in FIG. 1. Desirably, the housing portions may be joined by a continuous weld at a seam therebetween. This eliminates the need for a gasket between the housing portions along with the associated cost.

There is thus provided an actuator that allows reduced back drive effort compared to known systems such as the lost motion system described in the '130 patent. This advantage is, at least in part, achieved by placing the a clutch mechanism of the actuator relatively close to the output drive. Not only does the configuration according to the present invention reduce back drive effort, but it may also reduce or eliminate secondary noise associated with known systems such as that described in the '130 patent. With the clutching mechanism located close to the output drive, as opposed to adjacent the motor, there is a comparable reduction in the number of gears that must be back driven, either in manual or automated mode. This results in significantly reduced audible noise. Moreover, the cost of an actuator consistent with the invention is reduced compared to designs such as that disclosed in the '130 patent through a reduction in the number of components and through use of a continuous weld between housing halves.

It is to be understood that the embodiments that have been described herein are but some of the several which utilize this invention and are set forth here by way of illustration, but not of limitation. It is obvious that many other embodiments, which will be readily apparent to those skilled in the art may be made without departing materially from the spirit and scope of the invention.

What is claimed is:

1. An actuator having reduced back drive resistance comprising:
    an internal drive train including a reversible motor and at least one driven gear;
    a clutch coupled to said driven gear; and
    an output stage coupled between said clutch and an actuator output, said output stage comprising a worm gear directly coupled to said clutch, said worm gear driving a sector gear coupled to an actuator output;
    wherein said clutch is engaged when said motor is energized, and disengaged when said motor is not energized, and
    wherein said at least one driven gear comprises a pinion gear driven by said motor, said pinion driving a spur gear which in turn drives a second driven gear coupled to said clutch.

2. An actuator having reduced back drive resistance comprising:
    an internal drive train comprising a motor driving a pinion, said pinion driving a face gear coupled to a spur gear, said spur gear driving a clutch drive gear;
    an output stage comprising a worm gear, said worm gear driving a sector gear coupled to an actuator output; and
    a clutch coupled between said clutch drive gear of said internal drive train and an output gear of said output stage, said clutch directly coupled to said worm gear of said output stage, and said clutch being engaged when said motor is energized and disengaged when said motor is not energized.

3. The actuator according to claim 2 wherein said output gear comprises said sector gear.

4. An actuator having reduced back drive resistance comprising:
    an internal drive train including a reversible motor and at least one driven gear;
    a clutch coupled to said driven gear; and
    an output stage coupled between said clutch and an actuator output, said output stage comprising a worm gear coupled to said clutch, said worm gear driving a sector gear coupled to an actuator output;
    wherein said clutch is engaged when said motor is energized, and disengaged when said motor is not energized, said clutch preventing back driving of said internal drive train by a force applied to said actuator output, and
    wherein said at least one driven gear comprises a pinion gear driven by said motor, said pinion driving a spur gear which in turn a second driven gear coupled to said clutch.

5. The actuator according to claim 4, wherein said worm gear is directly coupled to said clutch.

* * * * *